United States Patent
Asadi et al.

(10) Patent No.: US 12,517,785 B2
(45) Date of Patent: Jan. 6, 2026

(54) NON-BLOCKING CHIPKILL RECOVERY

(71) Applicant: SK hynix Inc., Gyeonggi-do (KR)

(72) Inventors: Meysam Asadi, San Jose, CA (US);
Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 41 days.

(21) Appl. No.: 18/486,774

(22) Filed: Oct. 13, 2023

(65) Prior Publication Data

US 2025/0123922 A1 Apr. 17, 2025

(51) Int. Cl.
*G06F 11/10* (2006.01)
*G06F 13/16* (2006.01)

(52) U.S. Cl.
CPC ...... *G06F 11/1068* (2013.01); *G06F 11/1048* (2013.01); *G06F 13/1673* (2013.01)

(58) Field of Classification Search
CPC ............. G06F 11/1068; G06F 11/1048; G06F 13/1673
See application file for complete search history.

(56) References Cited

U.S. PATENT DOCUMENTS

| | | | |
|---|---|---|---|
| 8,321,752 B1 * | 11/2012 | Yang ................. | H03M 13/2906 714/779 |
| 8,555,139 B1 * | 10/2013 | Yang ................. | H03M 13/2906 714/801 |
| 8,756,473 B1 | 6/2014 | Marrow et al. | |
| 2009/0319843 A1 * | 12/2009 | Meir .................. | G06F 11/1068 714/E11.023 |
| 2014/0325318 A1 | 10/2014 | Marrow et al. | |
| 2017/0068593 A1 * | 3/2017 | Yoshinaga .......... | G11C 11/5642 |
| 2017/0271031 A1 * | 9/2017 | Sharon ................ | G11C 29/52 |
| 2021/0249435 A1 * | 8/2021 | Lai ..................... | H10B 43/50 |
| 2023/0421176 A1 * | 12/2023 | Doubchak ......... | H03M 13/2945 |

* cited by examiner

*Primary Examiner* — Mark D Featherstone
(74) *Attorney, Agent, or Firm* — IP & T GROUP LLP

(57) ABSTRACT

A memory system and a method for decoding of one or more codewords. The system has a storage medium having therein a first decode, a first processor associated with the storage medium and configured to XOR results obtained from the first decoder when the one or more codewords in the storage medium are decoded, and a memory controller having therein a second decoder and a buffer, the memory controller configured to XOR results obtained from the second decoder. The second decoder decodes the one or more codewords after failure of the first decoder to decode the one or more codewords.

20 Claims, 9 Drawing Sheets

NON-BLOCKING CHIPKILL RECOVERY

BACKGROUND

1. Field

Embodiments of the present disclosure relate to chipkill recovery schemes for memory systems.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may use various types of encoders/decoders.

SUMMARY

In one aspect of the present invention, there is provided a memory system for decoding of one or more codewords. The system has a storage medium having therein a first decode, a first processor associated with the storage medium and configured to XOR results obtained from the first decoder when the one or more codewords in the storage medium are decoded, and a memory controller having therein a second decoder and a buffer, the memory controller configured to XOR results obtained from the second decoder. The second decoder decodes the one or more codewords after failure of the first decoder to decode the one or more codewords.

In another aspect of the present invention, there is provided a method for decoding of one or more codewords. The method decodes one or more codewords in a storage medium by a first decoder residing in a storage medium, XORs successfully decoded codewords and saves XORed results to a buffer, transfers unsuccessfully decoded codewords to a second decoder for decoding, and XORs successfully decoded results obtained with the first decoder and successfully decoded results obtained with the second decoder in order to recover data from the failed decoding of the one or more codewords.

Additional aspects of the present invention will become apparent from the following description.

DETAILED DESCRIPTION

Figure 1:
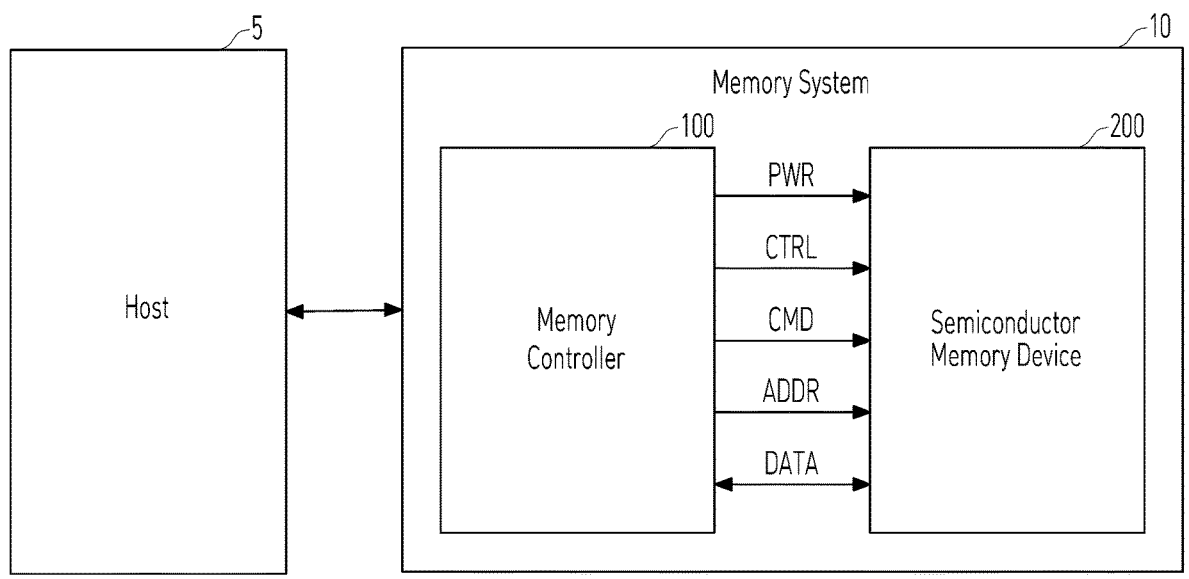
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "one embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents. Numerous specific details are set forth in the following description in order to provide a thorough understanding of the present invention. These details are provided for the purpose of example; the present invention may be practiced without some or all of these specific details. For clarity, technical material that is known in technical fields related to the present invention may not been described in detail.

Chipkill operations may be performed using a variety of error checking implementation. In one example, chipkill operations can be implemented by scattering bits of a Hamming code word across multiple memory chips, such that the failure of any single memory chip will affect only one bit per word. This allows memory contents to be reconstructed despite the complete failure of one chip. Chipkill operations are being increasingly incorporated into non-volatile memory system (e.g., a NAND flash memory or dual in-line memory modules DIMM) to ensure robust data storage and access.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
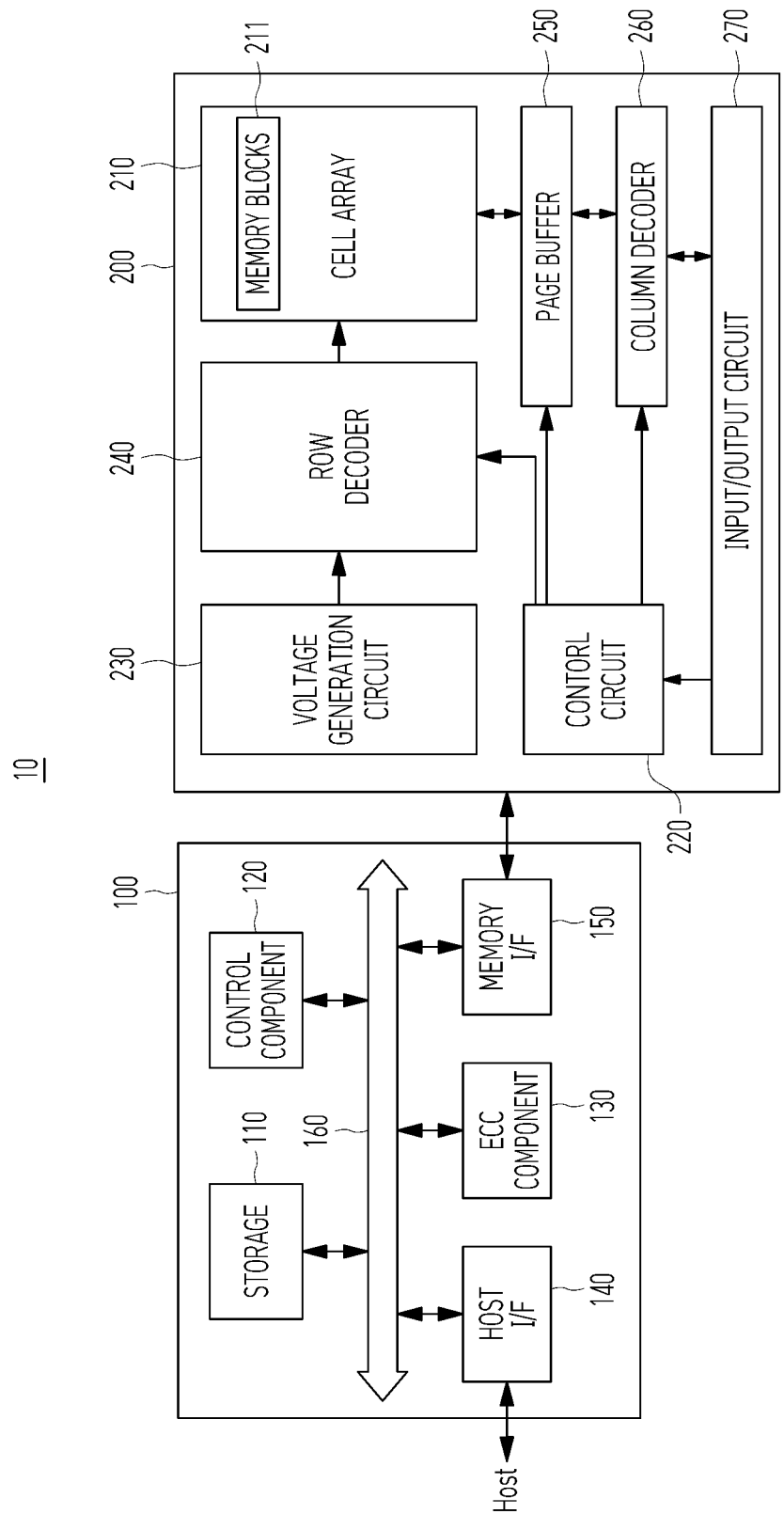
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The memory controller 100 may control storage of data in the memory device 200. For example, the memory controller 100 may control the memory device 200 in response to a request from the host device. The memory controller 100 may provide data read from the memory device 200 to the host device, and may store data provided from the host device into the memory device 200.

The memory controller 100 may include a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the memory controller 100, and store data for driving the memory system 10 and the memory controller 100. When the memory controller 100 controls operations of the memory device 200, the storage 110 may store data used by the memory controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the memory device 200 to allow the memory controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
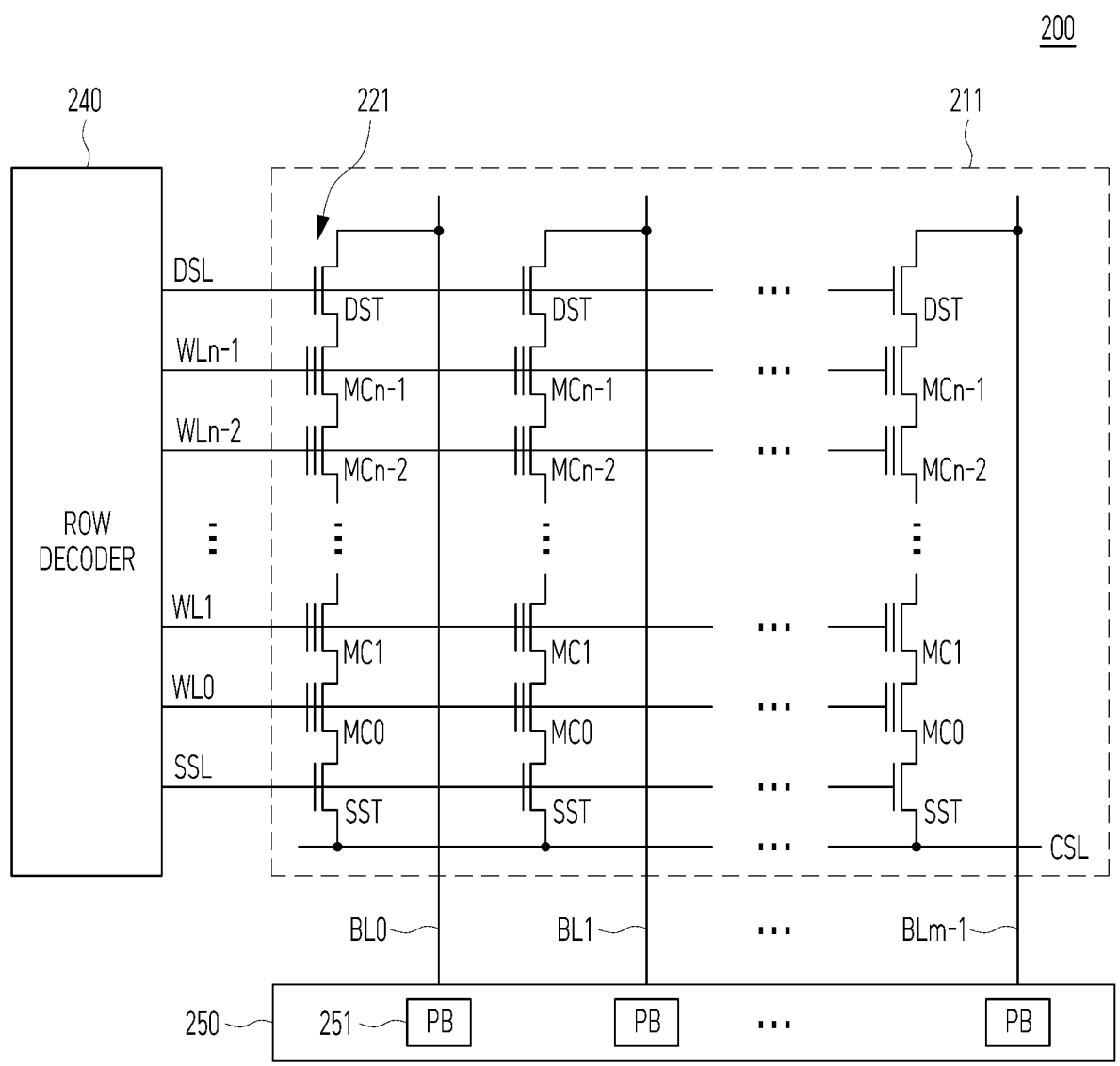
FIG. 3 is a circuit diagram illustrating a memory block of a memory device in accordance with another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with one embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
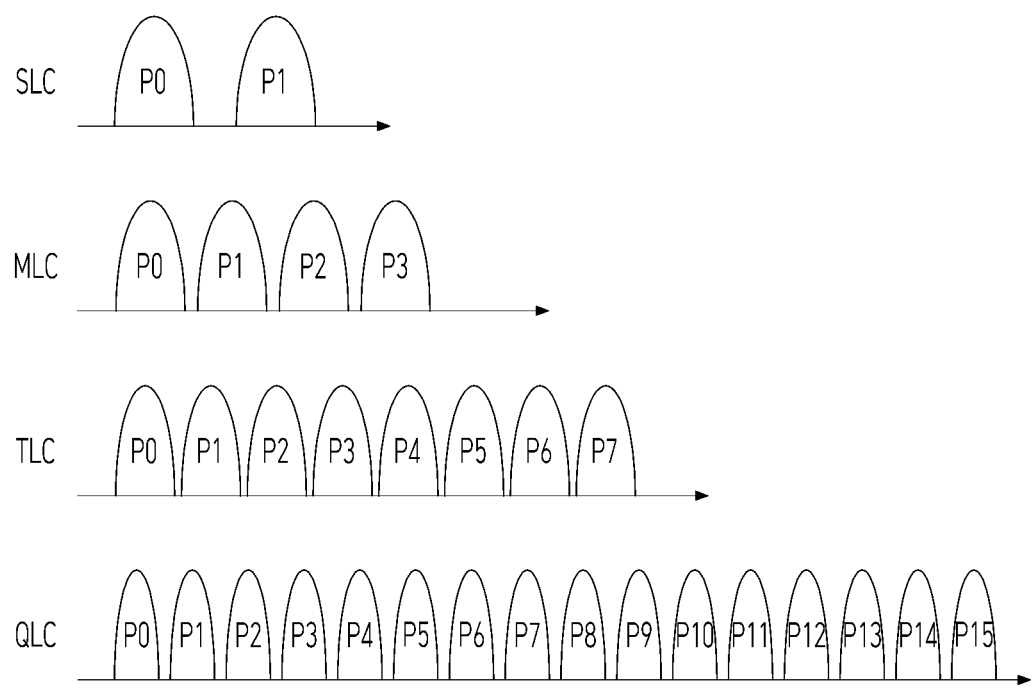
FIG. 4 is a diagram illustrating distributions of states for different types of cells of a memory device in accordance with another embodiment of the present invention.

FIG. 4 is a diagram illustrating distributions of states or program voltage (PV) levels for different types of cells of a memory device in accordance with one embodiment of the present invention.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as in a SSD.

Figure 5A:
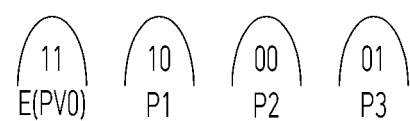
FIG. 5A is a diagram illustrating an example of Gray coding for a multi-level cell (MLC) in accordance with another embodiment of the present invention.

FIG. 5A is a diagram illustrating an example of coding for a multi-level cell (MLC) in accordance with one embodiment of the present invention.

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
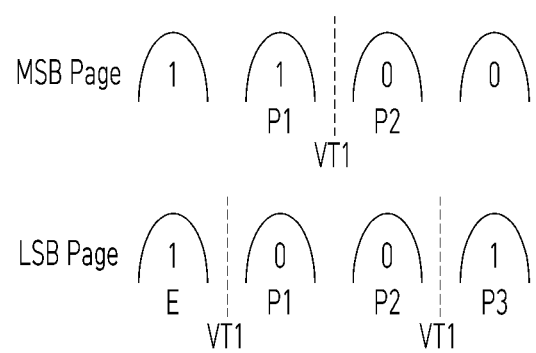
FIG. 5B is a diagram illustrating state distributions for pages of a multi-level cell (MLC) in accordance with another embodiment of the present invention.

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Referring back to FIGS. 1 and 2, the memory device 200 (in communication with the memory controller 100) may include a NAND-type flash memory device with memory cells such as single-level cells (SLCs), multi-level cells (MLCs), triple-level cells (TLCs) or quadruple-level cells (QLCs). In various embodiments, the memory device 200 may include a NAND-type flash memory device with QLC memory cells (i.e., QLCs).

The memory controller 100 may receive a command from a host, and provide the memory device 200 with the received command. For example, the memory controller 100 receives a write command and write data corresponding to the write command, and controls the memory device 200 to perform a program operation on the write data. In another example, the memory controller 100 receives a read command, and controls the memory device 200 to perform a read operation on data corresponding to the read command. The memory controller 100 can transmit read data corresponding to the read command to the host.

Additionally, when stored data in a storage such as cell array 210 is requested or otherwise desired (e.g., by an application or a user which stored the data), a decoder (for example in memory controller 100) may receive data from the storage. The received data may include some noise or errors. The decoder may perform detection on the received data and output decision and/or reliability information. The decoder may include at least one of a soft detector and a hard detector. Either the soft detector or the hard detector can provide channel information for decoders, such as a LDPC decoder. For example, the soft detector may output reliability information and a decision for each detected bit. On the other hand, the hard detector may output a hard decision on each bit without providing corresponding reliability information. As an example, the hard detector may output as the hard decision that a particular bit is a "1" or a "0" without indicating how certain or sure the detector is in that decision. In contrast, the soft detector may output a decision and reliability information associated with the decision. In general, reliability information indicates how certain the detector is in a given decision. In one example, a soft detector may output a log-likelihood ratio (LLR) where the sign indicates the decision (e.g., a positive value corresponds to a "1" decision and a negative value corresponds to a "0" decision) and the magnitude indicates how sure or certain the detector is in that decision (e.g., a large magnitude indicates a high reliability or certainty).

Figure 6:
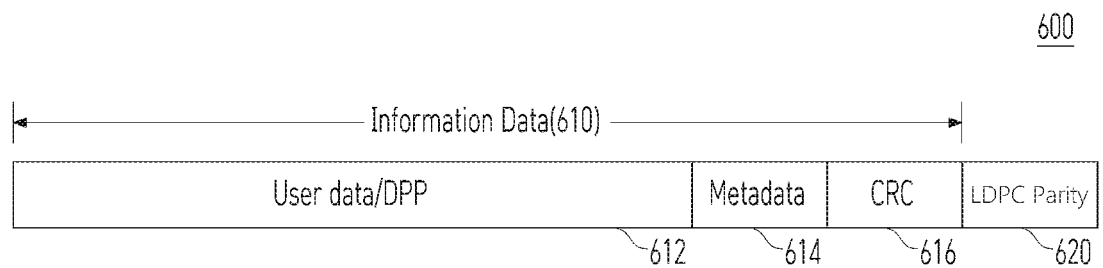
FIG. 6 is a schematic illustrating a codeword stored in a memory block containing user data and parity information in accordance with another embodiment of the present invention.

FIG. 6 is a diagram illustrating a format of a codeword 600 to be stored in a storage system. Referring to FIG. 6, the codeword 600 of the present invention may include information data 610 and a LDPC parity 620. In some embodiments, the codeword 600 may be generated based on the coded modulation techniques described above such the above noted LDPC codes. In other words, the information data 610 may be protected by LDPC codes. The information data 610 may include user data with data path protection (DPP) 612, meta-data 614, and cyclic redundancy check (CRC) parity bits 616. A CRC code which is an error-detecting code commonly used in digital networks and storage devices may detect accidental changes to raw data.

Here, in one embodiment of the present invention, the chipkill parity 620 comprises an outer parity in the codewords (such as shown in FIG. 6). For example, similar to that described in U.S. Pat. No. 8,756,473, a plurality of data sets may be encoded using an error correction code such as chipkill parity, and each encoded data set, with the respective codewords, is stored on a different stripe, where a stripe represents those data pages in multiple storage locations (even optionally including different memory die in the NAND) that are used to store associated data. In one embodiment of the present invention, the chipkill parity is equal to an exclusive OR (XOR) operation on successfully decoded codewords in the memory block. For example, consider that m denotes the stripe size for the sequence of bits shown in FIG. 6. By taking a bit-wise XOR for all sequences in the same stripe, the result is a parity sequence that (in one embodiment) is stored separately. In other words, let C1, C2, C3, . . . , Cm be the codeword sequences (each codeword sequence includes user data+meta data+LDPC parity) for the same stripe. Then, CK_parity=C1 xor C2 xor . . . xor Cm produces a parity sequence for this stripe, and in one embodiment the parity sequence is stored separately in the memory.

If the intended codeword fails soft decoding, Chipkill (CK) recovery can be used to recover the host read data. In this scheme, upon a soft decoding failure of host read, all the pages on the same stripe are read/decoded. Then, the intended host read data is recovered by XORing the data in the corresponding stripe containing the associated data.

In general, CK recovery usually is done by one of the following two methods.

Classical Chipkill

This scheme is implemented in a majority of the SSDs today to deal with media defects such as die/block/WL failure. The basic idea is to XOR some sectors into a parity sector. In the case that one sector fails the soft read/decode or the sector is lost due to media defect, the data can be recovered by reading/XORing the remaining sectors on the same stripe.

Super (Soft) Chipkill (SCK)

During the classical chipkill recovery process, if there are multiple (more than 2) sectors that fail the soft read/decode, data will be lost, and an unrecoverable error correction code (UECC) event will be reported to the host. However, SCK permits recovery of a codeword which failed its soft decode even when there are k>2 codewords (including itself) failing the soft decode on the same stripe.

With SCK, in a write-path, (n−1) data codewords are XORed into the chipkill parity codeword. In the read-path, when there is only one codeword failure with soft decoding, the remaining codewords on the same memory stripe will be read and XORed to recover the failed codeword. When there are more than one failed codeword on the memory stripe, SCK allows recovery of a codeword which failed its soft decode even when there are k>2 codewords (including itself) failing the soft decode on the same memory stripe.

In SCK, a parity codeword (such as chip kill parity) may be used. In one embodiment, the chipkill parity may (as calculated above) be used to recover failed codewords. For example, soft decoding can be applied across the failed codewords over a non-zero coset, which is equal to the XOR of all successfully decoded codewords on the same memory stripe.

Figure 7:
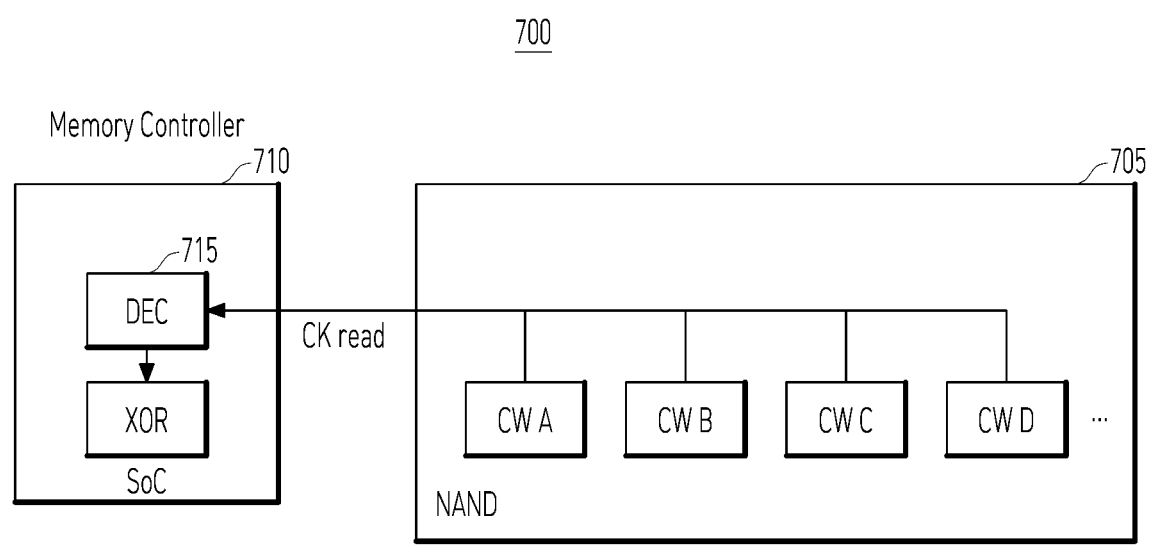
FIG. 7 is a schematic illustrating a system for blocking chipkill recovery from a failed decoding of one or more codewords.

FIG. 7 illustrates a system 700 for SCK error recovery. System 700 includes NAND storage 705 which stores information data 610 and codewords 620 (such as shown in FIG. 6). For illustrating the blocking CK data flow, system 700 is shown with codewords CW A, CW B, CW C, CW D, etc. which are codewords representing the data stored in respective pages. To recover one failed host read of a word line:

a) data from (n−1) other WLs in the same stripe are read under the control of the system on chip (SoC) memory controller 710, b) the data of each word line is transferred to/buffered in the SoC memory controller 710, c) the corresponding page in each WL is decoded by decoder 715, and d) a CK process controlled by the SoC memory controller 710 recovers the data by XORing the data from each word line that was transferred.

While this method is extremely effective in increasing the reliability of storage system, it is costly as it uses up almost all of the controller's virtual memory (CVM) available as a buffer in SoC memory controller 710 and typically increases the ECC decoding traffic. In fact, existing CK schemes are considered blocking schemes, since all the data for the whole stripe needs to be transferred into the ECC engine for all the pages in the stripe to be decoded, thereby blocking other operations which could have been performed by the main ECC module of the NAND. As a result, read collision with other host reads increases, and the overall performance of the solid state drive or NAND decreases.

Inventive Non-Blocking Chipkill Recovery

In one embodiment of the present invention, a non-blocking CK scheme is used in which the main CK steps are performed inside the NAND (such as in control circuit 220 shown in FIG. 2). Only needed (or otherwise requested) data and control signals are processed in the firmware (FW) of the SoC memory controller (such as in the memory controller 100 shown in FIGS. 1 and 2). This scheme reduces unnecessary transfer time for the data in all the pages in the stripe to be transferred and reduces the ECC decoding traffic/latency.

Figure 8:
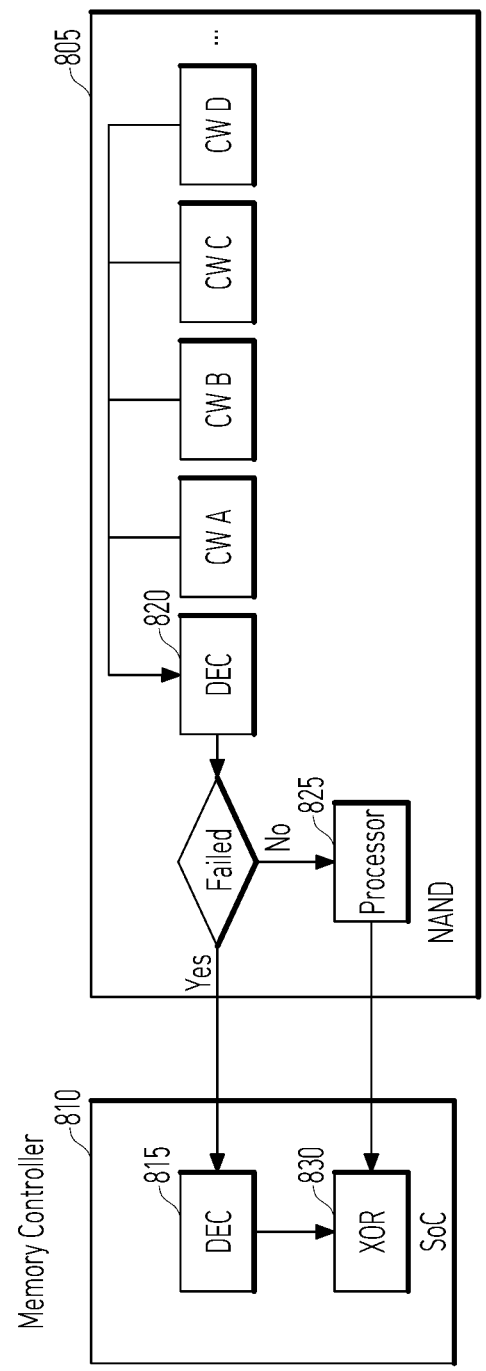
FIG. 8 is a schematic illustrating a system for non-blocking chipkill recovery from a failed decoding of one or more codewords in accordance with other embodiments of the present invention.

FIG. 8 illustrates a specific system 800 for non-blocking CK. System 800 includes NAND storage 805 which stores information data 610 and codewords 620 (such as shown in FIG. 6). For illustrating the non-blocking CK data flow, system 800 is shown with codewords (CW A, CW B, CW C, CW D, etc.) which are provided to decoder (DEC) 820 (considered a weak or light weight decoder, where these terms refer to a decoder which can be put in a NAND and which has a relatively lower gate-count for simple decoding. For example, a simple bit-flipping decoder that is light in terms of gate-count as compared to a min-sum (MS) decoder can be used as decoder 820. While a light weight decoder has relatively lower gate-count, it may not be better in terms of correction capability. In one embodiment of system 800, decoder 820 has a lower gate count than decoder 815 in the SoC. System 800 also includes a processor 825 which can XOR the successfully decoded codewords. System 800 also includes an XOR buffer for storing the XORed values.

As illustrated in FIG. 8, if decoding fails, the codewords can be passed to a stronger decoder such as decoder (DEC) 815 in the memory controller 810 (outside of NAND storage 805) where higher weight calculations can be made. This inventive scheme offloads some of Chipkill steps into processor 825 and/or decoder 820 of the NAND storage 805. As a result, data transfer between NAND storage 805 and SoC memory controller 810 can be reduced as evident from the observance that (usually) only a low number of errors have to be corrected in decoder 815 after not being corrected by decoder 820 in NAND storage 805.

Below is a pseudo-code for the non-blocking chipkill which would be implemented in a control circuit such as processor 825 within the NAND storage 805:

Let n be stripe size and $c\_i$ represent the set of codewords.
Start Decoding
  For i=∈[1,n],
    Decode $c\_i$ using decoder 820 in NAND storage 805

If decoding succeeds:
  using processor 825 in NAND storage 805 XOR the result and store the result in XOR Buffer 830 of memory controller 810
Else if decoding fails:
  Send a decode request signal to decoder 815 to decode the set $c\_i$
  Transfer log-likelihood ratio (LLR) data for $c\_i$ into decoder 815 inside SoC memory controller 810
  XOR the decoded result and store in the XOR buffer 830 of memory controller 810
Data Recovery:
  Transfer successfully decoded results in XOR buffer 830 obtained with decoder 820, and XOR the decoded results with successfully decoded results in XOR buffer 830 obtained with decoder 815 in order to recover the intended host data.

Since a NAND internal bandwidth is typically higher than external bandwidth(s), the decoding of corresponding pages in a stripe can be first tested using a low-weight ECC decoder such as decoder 820 in NAND storage 805. Using this scheme, only data for failed pages and XORed data inside NAND storage 805 for successful decoding are transferred to the XOR buffer 830 of memory controller 810. This reduces the amount of externally transferred data between NAND storage 805 and SoC memory controller 810, which improves the performance/QoS of CK schemes. Also, since less decoded attempts are needed to be done in SoC memory controller 810, this reduces the chance of read collision in the SoC memory controller 810.

In one embodiment of the present invention, there is provided a memory system for non-blocking chipkill recovery from a failed decoding of one or more codewords, that is in general a memory system for decoding of one or more codewords. The memory system comprises a storage medium having therein a first decoder; a first processor associated with the storage medium and configured to XOR results obtained from the first decoder when the one or more codewords in the storage medium are decoded; and a memory controller having therein a second decoder and a buffer, the configured memory controller to XOR results obtained from the second decoder, wherein the second decoder decodes the one or more codewords after failure of the first decoder to decode the one or more codewords.

In one embodiment of this system, the storage medium comprises a NAND device and the first decoder is located on the NAND device.

In one embodiment of this system, the first decoder comprises a relatively light weight decoder (such as a bit-flipping decoder) having a lower gate count than the second decoder. For example, in FIG. 8, decoder 820 has a lower gate count than decoder 815.

In one embodiment of this system, the first decoder is configured to receive the one or more codewords from a same stripe of data.

In one embodiment of this system, the first processor is configured to XOR results for successfully decoded codewords obtained by the first decode in order to recover data from the failed decoding of the one or more codewords.

In one embodiment of this system, the data recovered from the failed decoding of the one or more codewords is stored in the buffer of the memory controller.

In one embodiment of this system, the second decoder, after failure of the first decoder to decode the one or more codewords, is configured to decode the one or more codewords based on log likelihood ratios received in the second decoder for the one or more codewords.

In one embodiment of this system, the processor is configured to XOR a) successfully decoded results obtained with the first decoder and b) successfully decoded results obtained with the second decoder to recover data from the failed decoding of the one or more codewords.

In one embodiment of this system, the second processor comprises a main processor configured to process host requests while the first decoder is decoding the one or more codewords.

In one embodiment of this system, only data for pages having codewords unsuccessfully decoded by the first decoder and XORed data produced by the first processor are transferred to the memory controller.

Figure 9:
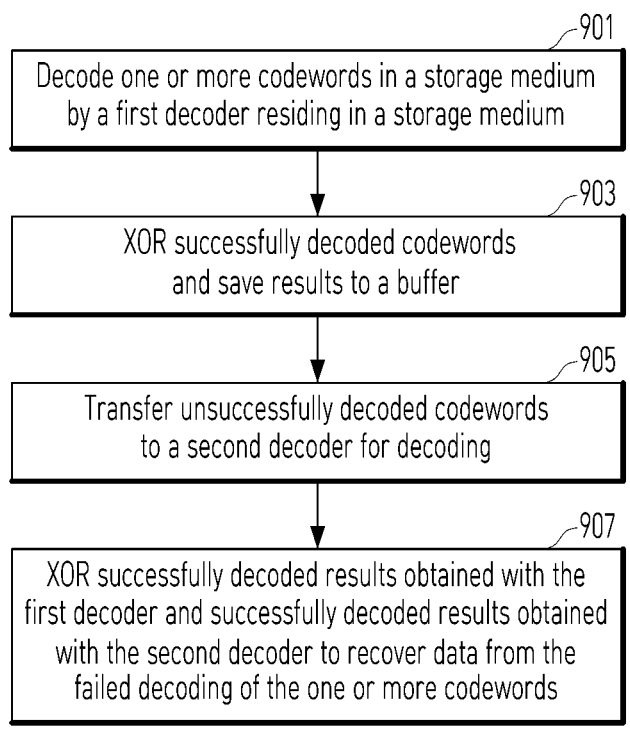
FIG. 9 is a flowchart illustrating an operation for non-blocking chipkill recovery from a failed decoding of one or more codewords in accordance with another embodiment of the present invention.

FIG. 9 is a flowchart illustrating a method system for decoding of one or more codewords in accordance with one embodiment of the present invention. In this method, at operation 901, one or more codewords in a storage medium are decoded by a first decoder residing in a storage medium. At 903, successfully decoded codewords are XORed and saved to a buffer. At 905, unsuccessfully decoded codewords are transferred to a second decoder for decoding. At 907, successfully decoded results obtained with the first decoder and successfully decoded results obtained with the second decoder are XORed to recover data from the failed decoding of the one or more codewords.

In one embodiment of this method, the decoding retrieves data for decoding from a NAND device comprising the storage medium in which the first decoder resides.

In one embodiment of this method, the decoding in the first decoder operates with a lower gate count than the second decoder.

In one embodiment of this method, the decoding retrieves the one or more codewords from a same stripe of data.

In one embodiment, this method further comprises XORs results for successfully decoded codewords obtained by the first decoder. In one embodiment, this method further comprises storing the data recovered from the failed decoding of the one or more codewords in the buffer.

In one embodiment, after failure of the first decoder to decode the one or more codewords, this method receives in the second decoder log likelihood ratios associated with failed codewords. The method may then decode the one or more codewords based on the log likelihood ratios received in the second decoder for the failed codewords.

In one embodiment, this method processes host requests in a main processor while the first decoder is decoding the one or more codewords.

In one embodiment, this method transfers only data for pages having codewords unsuccessfully decoded by the first decoder and XORed data produced by the first processor to the memory controller.

In one embodiment, this method performs non-blocking chipkill recovery after failed decoding of the codewords.

Although foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives. Furthermore, the embodiments may be combined to form additional embodiments.

What is claimed is:

1. A memory system for decoding of one or more codewords, the system comprising:
    a storage medium having therein a first decoder;
    a first processor associated with the storage medium and configured to exclusive OR (XOR) results obtained from the first decoder when the one or more codewords in the storage medium are decoded; and
    a memory controller having therein a second decoder and a buffer, the memory controller configured to XOR results obtained from the second decoder,
    wherein
    the first decoder in the storage medium has a lower gate-count than the second decoder in the memory controller, and
    the second decoder in the memory controller, comprising a stronger decoder than the first decoder, decodes the one or more codewords transferred to the memory controller after failure of the first decoder to decode the one or more codewords.

2. The memory system of claim 1, wherein the storage medium comprises a NAND device and the first decoder is located on the NAND device.

3. The memory system of claim 1, wherein the first decoder comprises a relatively light weight bit-flipping decoder having the lower gate count than the second decoder comprising a min-sum decoder.

4. The memory system of claim 1, wherein the first decoder is configured to receive the one or more codewords from a same stripe of data.

5. The memory system of claim 1, wherein data recovered from the failed decoding of the one or more codewords is stored in the buffer of the memory controller.

6. The memory system of claim 1, wherein the second decoder, after failure of the first decoder to decode the one or more codewords, is configured to decode the one or more codewords based on log likelihood ratios received in the second decoder for the one or more codewords.

7. The memory system of claim 1, wherein the memory controller is configured to XOR a) successfully decoded results obtained with the first decoder and b) successfully decoded results obtained with the second decoder to recover data from the failed decoding of the one or more codewords.

8. The memory system of claim 1, wherein the memory controller comprises a main processor configured to process host requests while the first decoder is decoding the one or more codewords.

9. The memory system of claim 4, wherein the first processor is configured to XOR results for successfully decoded codewords obtained by the first decoder in order to recover data from the failed decoding of the one or more codewords.

10. The memory system of claim 8, wherein only data for pages having codewords unsuccessfully decoded by the first decoder and XORed data produced by the first processor are transferred to the memory controller.

11. A method for system for decoding of one or more codewords, the method comprising:
    decoding one or more codewords in a storage medium by a first decoder residing in a storage medium;
    exclusive ORing (XORing) successfully decoded codewords and saving XORed results to a buffer;
    transferring unsuccessfully decoded codewords to a second decoder in a memory controller for decoding the unsuccessfully decoded codewords; and
    XORing successfully decoded results obtained with the first decoder and successfully decoded results obtained with the second decoder in order to recover data from the failed decoding of the one or more codewords, wherein the first decoder in the storage medium has a lower gate-count than the second decoder in the memory controller, and the second decoder in the memory controller, comprising a stronger decoder than the first decoder, decodes the unsuccessfully decoded codewords transferred to the memory controller.

12. The method of claim 11, wherein the decoding retrieves data for decoding from a NAND device comprising the storage medium in which the first decoder resides.

13. The method of claim 11, wherein the decoding in the first decoder comprising a relatively light weight bit-flipping decoder operates with the lower gate count than the second decoder comprising a min-sum decoder.

14. The method of claim 11, wherein the decoding retrieves the one or more codewords from a same stripe of data.

15. The method of claim 11, further comprising XORs results for successfully decoded codewords obtained by the first decoder.

16. The method of claim 11, further comprising storing the data recovered from the failed decoding of the one or more codewords in the buffer.

17. The method of claim 11, wherein, after failure of the first decoder to decode the one or more codewords, receiving in the second decoder log likelihood ratios associated with failed codewords.

18. The method of claim 11, further comprising processing host requests in a main processor while the first decoder is decoding the one or more codewords.

19. The method of claim 11, further comprising transferring only data for pages having codewords unsuccessfully decoded by the first decoder and XORed data produced by the first processor to the memory controller.

20. The method of claim 17, further comprising decoding the one or more codewords based on the log likelihood ratios received in the second decoder for the failed codewords.

* * * * *